United States Patent [19]

Richter et al.

[11] Patent Number: 4,516,887

[45] Date of Patent: May 14, 1985

[54] FEEDER DEFLECTION COMPENSATION

[75] Inventors: Ole J. Richter, Karlstad, Sweden; Johan C. F. C. Richter, Oslo, Norway

[73] Assignee: Kamyr, Inc., Glens Falls, N.Y.

[21] Appl. No.: 517,747

[22] Filed: Jul. 27, 1983

[51] Int. Cl.³ .................... B65G 53/30; B65G 53/46
[52] U.S. Cl. .................................... 406/63; 406/105; 210/251
[58] Field of Search ............... 406/63, 64, 65, 67, 406/171-172, 105; 210/251

[56] References Cited

U.S. PATENT DOCUMENTS

| 4,082,368 | 4/1978 | Funk | 406/63 |
|---|---|---|---|
| 4,187,043 | 2/1980 | Kindersley | 406/63 |
| 4,338,049 | 7/1982 | Richter et al. | 406/63 |
| 4,354,777 | 10/1982 | Richter et al. | 406/63 |
| 4,415,296 | 11/1983 | Funk | 406/63 X |

FOREIGN PATENT DOCUMENTS

| 2091573A | 8/1982 | United Kingdom | 406/63 |
| 673564 | 6/1974 | U.S.S.R. | |

Primary Examiner—Jeffrey V. Nase
Assistant Examiner—L. E. Williams
Attorney, Agent, or Firm—Cushman, Darby & Cushman

[57] ABSTRACT

A high-pressure transfer device, utilizable with wood chips or particulate material, includes low-pressure inlet and outlet ports, with low-pressure shoes associated therewith, and high-pressure inlet and outlet ports with high-pressure shoes associated therewith. A rotor containing a plurality of diametrically through-going pockets operatively communicates with the ports. The low-pressure ports, and shoes, are quadrate in cross-section, and retainers are provided surrounding the low-pressure shoes for guiding radial movement thereof. The retainers include end portions which engage side walls of the high-pressure shoes for guiding radial movement thereof. Biasing means bias the shoes into operative association with the rotor to maintain effective sealing between the rotor and housing, unaffected by radial deflection of the housing. The high-pressure shoes contain through-extending openings which may be quadrate in cross-section at the portions thereof closest to the rotor, and circular in cross-section at the portions thereof furthest from the rotor. Pressure compensators, supplied with hydraulic fluid at a pressure proportional to that at the high-pressure inlet and outlet, are operatively associated with the high-pressure shoes to maintain the bias thereof into engagement with the rotor. The rotor, and all shoes, are made of metal.

14 Claims, 4 Drawing Figures

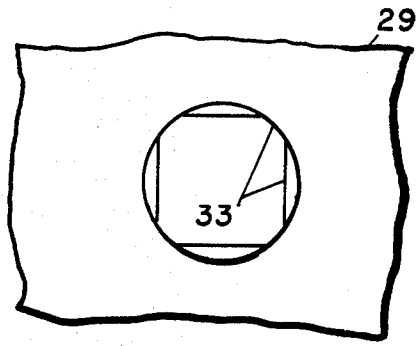
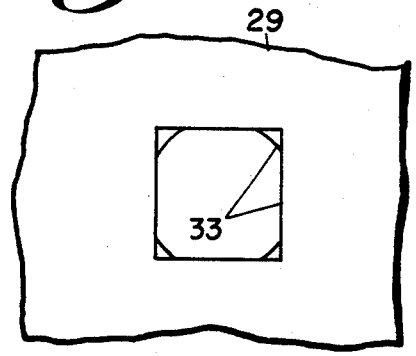
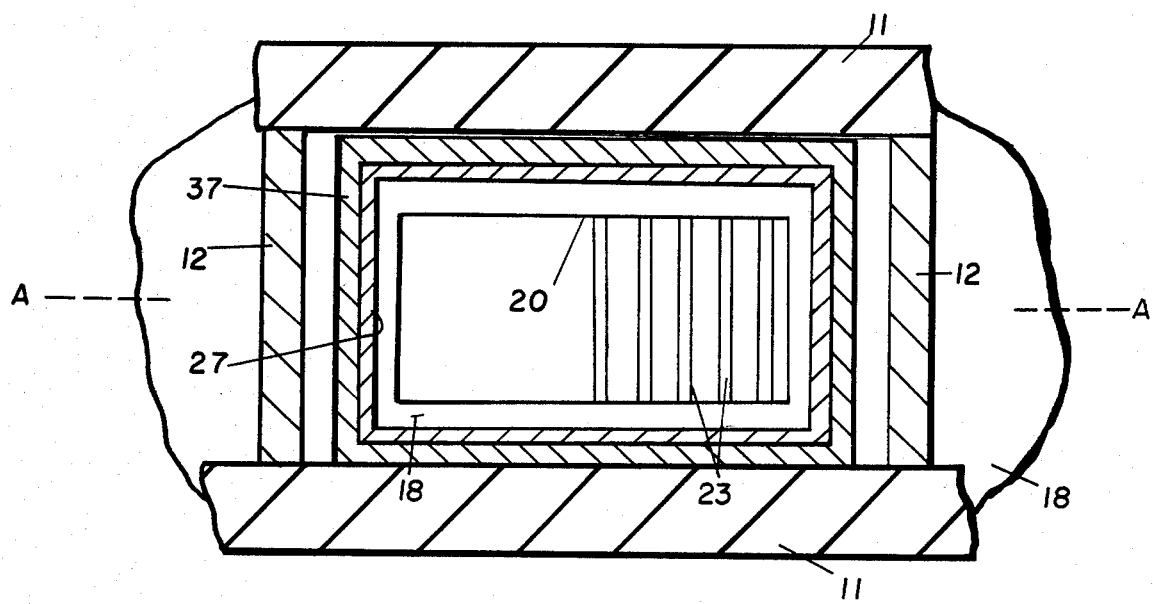

FEEDER DEFLECTION COMPENSATION

BACKGROUND AND SUMMARY OF THE INVENTION

The high-pressure transfer device according to the invention contains many features in common with that in the copending application Ser. No. 209,118 filed Nov. 21, 1980, now U.S. Pat. No. 4,430,029—the disclosure of which is hereby incorporated by reference herein—such as minimizing leakage that may come about as a result of radial deflection of the housing, accommodating a large amount of wear of the operative components before replacement, etc. The device according to the present invention is, however, more particularly applicable to the transfer of wood chips, and the like, although it is also useful in the transfer of coal, oil shale, and like hard particulate material.

The basic features of the high-pressure transfer device according to the invention include a cylindrical pocketed rotor, a housing enclosing the rotor and having low-pressure inlet and outlet ports, and high-pressure inlet and outlet ports, means for mounting the rotor for rotation with respect to the housing, screen means for screening particulate material above a predetermined size out of the liquid, and sealing means disposed in a large clearance volume between the rotor and housing for maintaining effective sealing between the rotor and housing. The sealing means preferably comprises a low-pressure inlet shoe, a low-pressure outlet shoe, a high-pressure inlet shoe, and a high-pressure outlet shoe.

According to the present invention, particular retainer means are associated with the shoes for guiding the radial movement thereof, and prevent rotation of the shoes with respect to the housing. The retainer means preferably takes the form of a retainer associated with each of the low-pressure inlet and low-pressure outlet. The retainers each comprise a portion including side wall portions which engage side walls of the low-pressure shoes, and end wall portions—generally transverse to the side wall portions—engaging side walls of the high-pressure shoes. Preferably the low-pressure inlet and outlet ports are quadrate (square or rectangular) in cross-section, as are the low-pressure inlet and outlet shoes, and the retainers.

High-pressure compensators are associated with the high-pressure shoes and supplied with hydraulic fluid to maintain a biasing force proportional to the pressure in the high-pressure inlet and outlet. One pressure compensator surrounds each of the high-pressure inlet and outlet ports. The openings in the high-pressure shoes which cooperate with the high-pressure inlet and outlet ports, respectively, may be cylindrical, or they may be circular in cross-section at the portions thereof most remote from the rotor, and taper to be quadrate (e.g. square) in cross-section at the portions thereof closest the rotor. This facilitates the utilization of a quadrate pocket mouth, which is especially desirable for cooperation with the quadrate low-pressure inlet and outlet ports.

The housing is allowed to deflect radially under heavy pressure loads since the shoes will accommodate housing deflection without undesired leakage. The housing may be formed by a plurality of axially extending ribs disposed around the periphery thereof, and joined at the ends by radially extending ribs.

It is the primary object of the present invention to provide an effective high-pressure transfer device for use with wood chips, particulate material, and the like. This and other objects of the invention will become clear from an inspection of the detailed description of the invention and from the appended claims.

BRIEF DESCRIPTION OF THE DRAWINGS

FIGS. 2a and 2b are top and bottom plan views, respectively, of a portion of an exemplary high-pressure shoe utilized in the device of FIG. 1; and FIG. 3 is a cross-sectional view taken generally along lines 3—3 in FIG. 1, and showing only a portion of the entire device.

DETAILED DESCRIPTION OF THE DRAWINGS

Figure 1:
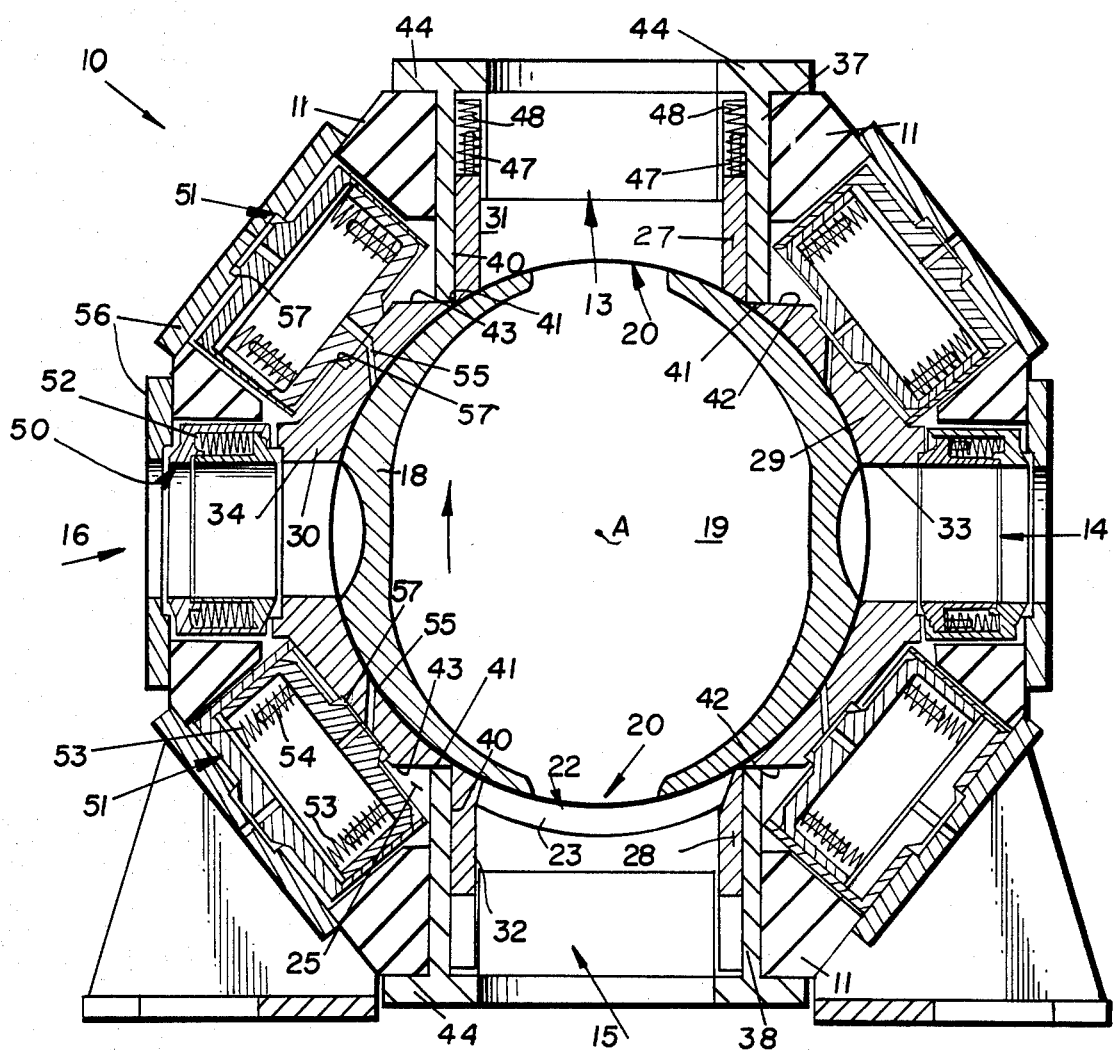
FIG. 1 is a side cross-sectional view of an exemplary high-pressure shoe according to the present invention.

An exemplary high-pressure device according to the present invention is shown generally by reference numeral 10 in FIG. 1. The device includes a housing, formed by a plurality of axially extending solid ribs 11 interconnected by radial ribs 12 (see FIG. 3) which are welded, or otherwise affixed thereto, and defining four ports around the periphery thereof, including a low-pressure inlet port 13, a high-pressure outlet port 14, a low-pressure outlet port 15, and a high-pressure inlet port 16.

A rotor 18 is mounted within the housing for rotation about an axis A—A. Means are provided for mounting the rotor for rotation, such as spindles formed at the end of the rotor and cooperating with bearings stationarily mounted with respect to the housing 11, 12, or utilizing a means such as shown in U.S. Pat. No. 4,430,029. The rotor includes a plurality of diametrically through-going pockets 19 (see FIG. 1) including inlet and outlet openings 20 to each, the pockets 19 and openings 20, and disposition thereof, being generally comparable to that in U.S. Pat. No. 4,430,029 except that the openings 20 are preferably quadrate in cross-section (see FIG. 3).

Screen means are provided for screening particulate material above a predetermined size out of the liquid passing through at least one of the ports. The screen means may take the form of an internally mounted screen as illustrated in U.S. Pat. No. 4,430,029, but preferably takes the form of a slotted screen, shown generally by reference numeral 22 in FIG. 1, and stationary with respect to the housing 11, 12. The slotted screen includes a plurality of ribs 23 (see FIGS. 1 and 3) spaced axially from each other.

A large clearance volume, illustrated generally by reference numeral 25 in FIG. 1, is provided between the housing 11, 12, and the rotor 18, and sealing means are disposed in the volume 25 for providing a biasing force and radially movable for maintaining effective sealing between the rotor 18 and housing 11, 12 unaffected by radial deflection of the housing. Such sealing means preferably take the form of two low-pressure shoes, and at least two high-pressure shoes. The low-pressure inlet shoe is illustrated generally by reference numeral 27, and the low-pressure outlet shoe—which is integral with the screen 22—by reference numeral 28, and preferably a single high-pressure outlet shoe 29 is provided, and a single high-pressure inlet shoe 30. Each of the shoes contains a through-extending opening aligned with its associated port. For instance the shoe 27 includes means defining an opening 31 in alignment with low-pressure inlet port 13; low-pressure outlet shoe 28 includes means defining an opening 32 in alignment with the low-pressure outlet 15; high-pressure outlet shoe 29 includes means defining an opening 33 in alignment with the high-pressure outlet 14, and high-pressure inlet shoe 30 includes means defining an opening 34 in alignment with the high-pressure inlet port 16.

The rotor 18, and shoes 27–30, preferably are of metal. Shoes 27–30 may be of a less wear-resistant metal than rotor 18.

The ports 13, 15, are preferably quadrate (rectangular or square) in cross-section, as are the shoes 27, 28, and retainers 37, 38 (to be hereinafter described) surrounding the shoes 27, 28. This can be seen particularly in FIG. 3. The quadrate, large openings allow good filling of the rotor pockets 19.

The openings 33, 34 in the shoes 29, 30, may by cylindrical. Alternatively, they may be quadrate in cross-section at the portion thereof in operative association with the rotor 18 to more closely correspond to the openings 20 to the pockets 19. That is, as an inspection of FIGS. 2a and 2b, for high-pressure outlet shoe 29 (the situation is the same for the high-pressure inlet shoe 30), makes clear, the opening 33 may be circular in cross-section at the portion thereof most remote from the rotor 18 (see FIG. 2a), and may be quadrate in cross-section at the portion thereof closest to the rotor 18 (see FIG. 2b).

The retainers 37, 38, comprise means for guiding radial movement of the shoes 27–30, and additionally prevent any rotation thereof with respect to the housing 11, 12. This is easily accomplished by providing the retainers with first portions thereof—side wall portions 40—which engage side walls of the low-pressure shoes 27, 28 to guide radial movement thereof, and by providing the retainers with second, end-wall portions—see reference numerals 41 in FIG. 1—which are generally transverse to the side walls portions 40, and which engage both the high-pressure shoes 29, 30. In particular side wall portions 42, 43 of the high-pressure shoes 29, 30, are abutted by the end walls 41.

The retainers 37, 38 also include upper flange portions 44 which straddle a pair of axial ribs 11, and are bolted, or otherwise attached, thereto. A single retainer 37, 38 may be associated with each low-pressure shoe 27, 28 and cooperating series of pockets 19, or a single integral structure may be provided as a retainer for a plurality (e.g. three) of axially aligned low-pressure shoes and cooperating rotor pockets.

The low-pressure shoes 27, 28 are biased into engagement with the external periphery of the rotor 18 by springs, or like biasing means. Such biasing means are shown only for the shoe 27 in FIG. 1, although such means are used with both shoes. In the exemplary form illustrated in FIG. 1, the low-pressure shoe 27 has a plurality of posts 47 associated therewith, each receiving a coil spring 48. Any number of posts 47 and springs 48 may be provided around the top periphery of the shoe 27, to provide an effective biasing force.

Biasing of the high-pressure shoes 29, 30, into operative association with the external periphery of the rotor 18 is preferably provided by a plurality of hydraulic pressure compensators (piston and cylinder assemblies), which may be spring-preloaded. In the exemplary embodiment of the invention illustrated in FIG. 1, a first hydraulic pressure compensator 50 is shown surrounding the high-pressure inlet 16, while a pair of pressure compensators 51 flank the compensator 50. The compensator 50 includes a preload by one or a plurality of coil springs 52, or the like, and the pressure compensators 51 are similarly preloaded, as by coil springs 53 surrounding posts 54 disposed internally thereof. The interiors of the compensators 51, and optionally compensator 50, are operatively interconnected to the high-pressure source—in the manner described in U.S. Pat. No. 4,430,029—for supplying a biasing force to the shoes proportional to the pressure of the high-pressure liquid. The rotor 30 includes through-extending opening 55 formed therein providing cooperation between the volume immediately surrounding the rotor and the interior of the pressure compensators 51, in basically the same manner as described in U.S. Pat. No. 4,430,029. Note that end plates 56 for mounting the compensators 50, 51, extend between adjacent housing ribs 11, and are bolted—or otherwise attached—thereto. The ends 57 of compensators 51 are generally spherical segments which fit into removal ball valve type seats 58 in the shoe 30 and plates 56.

The identical, or similar, pressure compensators are provided associated with the shoe 29 as described above with respect to the shoe 30.

It will thus be seen that according to the present invention an effective high-pressure transfer device has been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A high-pressure transfer device including: a cylindrical pocketed rotor containing a plurality of diametrically through-going pockets, said rotor rotatable about an axis; a housing enclosing said rotor and having an exterior periphery having four ports including a high-pressure inlet opposite a high-pressure outlet, and a low-pressure intlet opposite a low-pressure outlet; means for mounting said rotor for rotation with respect to said housing ports about said given axis of rotation in a given direction of rotation; screen means for screening particulate material above a predetermined size out of the liquid passing through at least one of said ports; at least one high-pressure shoe associated with said high-pressure inlet and at least one high-pressure shoe associated with said high-pressure outlet; at least one low-pressure shoe having an opening aligned with said low-pressure inlet and at least one low-pressure shoe having an opening aligned with said low-pressure outlet; each of said shoes disposed between said rotor and said housing; and retainer means for guiding radial movement of all of said shoes, and preventing rotation thereof with respect to said housing.

2. A device as recited in claim 1 wherein said retainer means comprises a retainer associated with each low-pressure shoe, each retainer having side wall portions operatively engaging side wall portions of the low-pressure shoe with which it is associated, and containing end wall portions, generally transverse to said side wall portions, for engaging side wall portions of said high-pressure shoes.

3. A device as recited in claim 2 wherein said low-pressure inlet port is quadrate in cross-section, and wherein said low-pressure shoe and associated retainer are also quadrate in cross-section.

4. A device as recited in claim 3 wherein said low-pressure outlet is quadrate in cross-section, and wherein said low-pressure outlet shoe and associated retainer are also quadrate in cross-section.

5. An assembly as recited in claim 4 wherein said screen means comprises a slotted screen integral with said low-pressure outlet shoe.

6. A device as recited in claim 1 wherein a single high-pressure shoe is associated with said high-pressure inlet and a single high-pressure shoe is associated with said high-pressure outlet, said high-pressure shoe associated with high-pressure inlet including an opening therein aligned with said high-pressure inlet port, and said high-pressure shoe associated with said high-pressure outlet including an opening therein aligned with said high-pressure outlet; and wherein each of said openings in said high-pressure shoes is generally circular in cross-section at a portion thereof most remote from said rotor, and is essentially quadrate in cross-section at the portion thereof closest said rotor.

7. A device as recited in claim 6 further comprising three pressure compensators operatively associated with each of said high-pressure shoes, said pressure compensators being circumferentially spaced around the external periphery of each of said shoes, and one of said pressure compensators surrounding said high-pressure inlet, or outlet, respectively; at least some of said pressure compensators being hydraulic and being operatively connected to a source of hydraulic fluid for applying a biasing force to its associated high-pressure shoe proportional to the pressure at said high-pressure inlet and outlet.

8. A device as recited in claim 1 wherein a single high-pressure shoe is associated with each of said high-pressure inlet and high-pressure outlet; and three pressure compensators operatively associated with each of said high-pressure shoes, said pressure compensators being circumferentially spaced around the external periphery of each of said shoes, and one of said pressure compensators surrounding said high-pressure inlet, or outlet, respectively; at least some of said pressure compensators being hydraulic and being operatively connected to a source of hydraulic fluid for applying a biasing force to its associated high-pressure shoe proportional to the pressure at said high-pressure inlet and outlet.

9. A device as recited in claim 8 wherein each of said high-pressure shoes comprises means defining a liquid through-extending opening therein in operative association with each pressure compensator associated with said shoe except for said pressure compensator surrounding said high-pressure inlet or outlet.

10. A device as recited in claim 1 wherein said housing comprises a plurality of solid axially extending ribs, and a plurality of radially extending ribs interconnecting said axially extending ribs.

11. A high-pressure transfer device including: a cylindrical pocketed rotor containing a plurality of diametrically through-going pockets, said rotor rotatable about an axis, a housing enclosing said rotor and having an exterior periphery having four ports including a high-pressure inlet opposite a high-pressure outlet, and a low-pressure inlet opposite a low-pressure outlet; means for mounting said rotor for rotation with respect to said housing ports about said given axis of rotation in a given direction of rotation; screen means for screening particulate material above a predetermined size out of the liquid passing through at least one of said ports; at least one high-pressure shoes associated with said high-pressure inlet and at least one high-pressure shoe associated with said high-pressure outlet; a low-pressure shoe having an opening aligned with said low-pressure inlet and a low-pressure shoe having an opening aligned with said low-pressure outlet; each of said shoes disposed between said rotor and said housing; and wherein said low-pressure inlet, and associated low-pressure shoe, are essentially quadrate in cross-section.

12. A device as recited in claim 11 wherein said low-pressure outlet is quadrate in cross-section, and wherein said low-pressure outlet shoe and associated retainer are also quadrate in cross-section.

13. A device as recited in claim 11 wherein a single high-pressure shoe is associated with said high-pressure inlet and a single high-pressure shoe is associated with said high-pressure outlet, said high-pressure shoe associated with said high-pressure inlet including an opening therein aligned with said high-pressure inlet port, and said high-pressure shoe associated with said high-pressure outlet including an opening therein aligned with said high-pressure outlet; and wherein each of said openings in said high-pressure shoes is generally circular in cross-section at a portion thereof most remote from said rotor, and is essentially quadrate in cross-section at the portion thereof closest said rotor.

14. A device as recited in claim 11 wherein said housing comprises a plurality of solid axially extending ribs, and a plurality of radially extending ribs interconnecting said axially extending ribs.

* * * * *